United States Patent [19]

Fischer

[11] 4,124,348
[45] Nov. 7, 1978

[54] APPARATUS FOR PRODUCING VARIEGATED SOAP

[75] Inventor: Charles F. Fischer, Jersey City, N.J.

[73] Assignee: Colgate-Palmolive Company, New York, N.Y.

[21] Appl. No.: 770,451

[22] Filed: Feb. 22, 1977

Related U.S. Application Data

[62] Division of Ser. No. 596,299, Jul. 16, 1975, Pat. No. 4,041,119.

[51] Int. Cl.² .................. B29C 17/14; B29F 3/12
[52] U.S. Cl. .................. 425/297; 425/131.1; 425/305.1; 425/308; 425/321; 425/322; 425/325; 425/334; 425/391
[58] Field of Search .................. 264/75, 176 R; 425/302 R, 304, 320, 321, 322, 325, 391, 334, 131.1, 308, 319, 297, 323, 302.1, 305.1; 72/256

[56] References Cited

U.S. PATENT DOCUMENTS

| 2,171,095 | 8/1939 | Orsini | 264/75 X |
| 2,414,097 | 1/1947 | Garvey et al. | 264/176 R X |
| 3,485,905 | 12/1969 | Compa et al. | 264/75 |
| 3,635,634 | 1/1972 | Nagano et al. | 425/325 |
| 3,807,076 | 4/1974 | Bridge | 425/391 X |
| 4,009,235 | 2/1977 | Bober | 425/391 X |

Primary Examiner—Francis S. Husar
Assistant Examiner—Mark Rosenbaum
Attorney, Agent, or Firm—Strauch, Nolan, Neale, Nies & Kurz

[57] ABSTRACT

A column of striated soap extruding from a plodder nozzle is subjected to torque for obtaining spiral striations in the final soap bar.

7 Claims, 5 Drawing Figures

U.S. Patent  Nov. 7, 1978  4,124,348
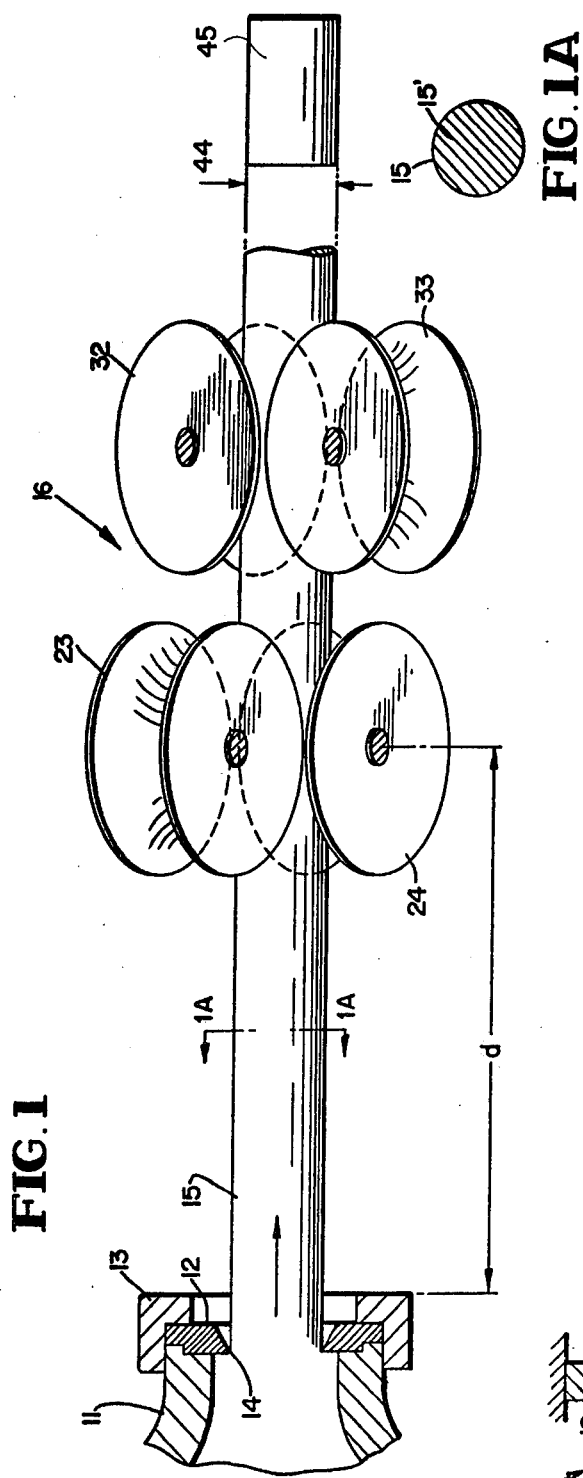
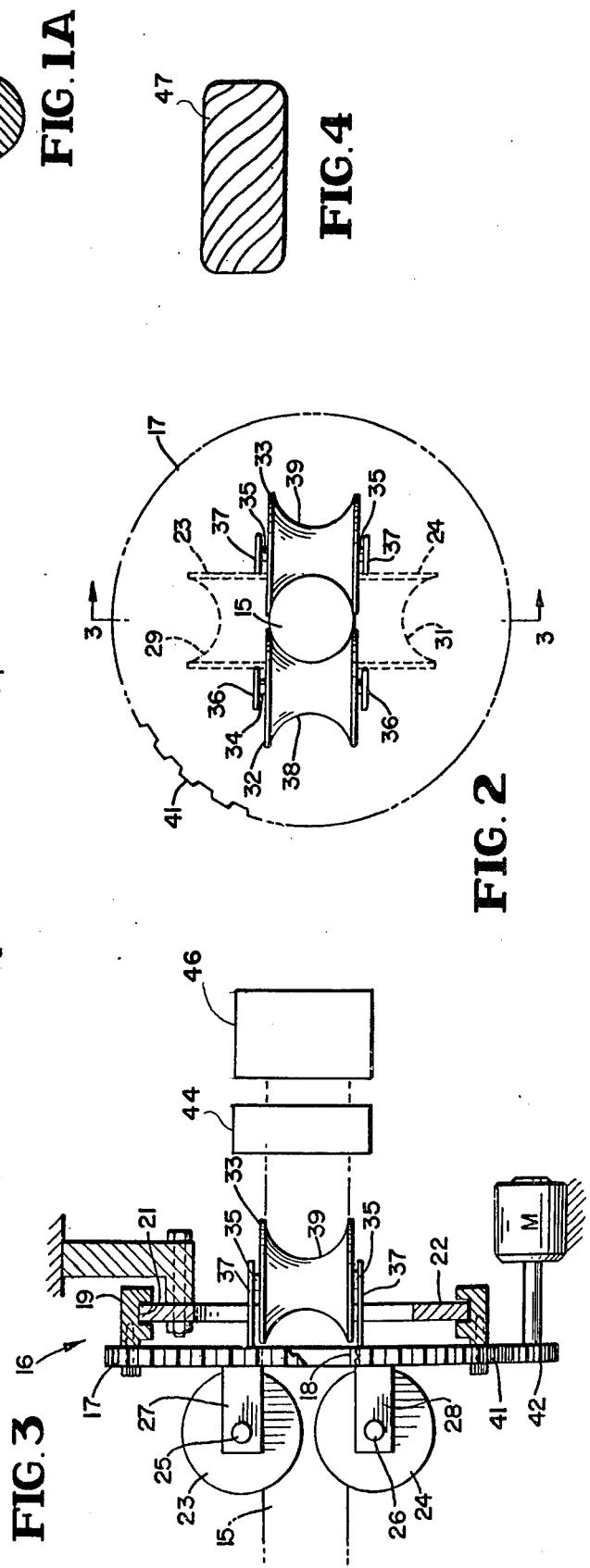

APPARATUS FOR PRODUCING VARIEGATED SOAP

This invention relates to the production of variegated, striated and marbelized soap wherein the striations are given a predetermined directional change in the soap column emerging from the plodder.

The production of variegated soap has developed considerably and many methods and apparatus for producing the same have been proposed and used. Compa et al. U.S. Pat. No. 3,485,905 and Matthei U.S. Pat. No. 3,832,431 disclose methods and apparatus for producing variegated soap that are in commercial use. In these systems, as in essentially all known systems for the purpose, the soap column issuing from the exit nozzle of the plodder assembly consists of a soap of a base color (white, light green, etc.) containing longitudinally extending differently colored streaks or layers. These prior proposals differ mainly in the mode of incorporating the coloring material into the base soap, and they all seek substantially the same variegated effect in the extruded column.

Conventionally in all systems the extruded striated column is subdivided and pressed to provide final soap bars wherein the striations appear in the cross sections. Hitherto these striations have been mainly straight or flat streaks or layers.

As will appear the invention is applicable to substantially any plodder assembly that extrudes striated soap in that it acts on the extruding column as it leaves the plodder assembly and before subdivision.

The invention contemplates the provision of an improved and enhanced decorative appearance in the final bar by imparting torque to twist an extruding striated column as it leaves the plodder and remains workably warm and soft whereby the generally longitudinal striations are imparted a spiral or like controlled twist, and the invention thus advantageously provides novel apparatus for producing final soap bars having specially contoured striations.

The invention further advantageously provides a novel grip roller arrangement receiving and twisting the extruding striated column as it leaves the plodder. Pursuant to this feature the rollers are mounted in a frame that is rotated about the axis of the extruding column and carries suitably shaped rollers that peripherally grip the column, the rollers being either idly rotatably mounted or driven where special effects may be desired. The speeds of column extrusion and twisting are correlated to obtain desired effects.

Further advantages will appear as the description proceeds in connection with the appended claims and the annexed drawings.

BRIEF DESCRIPTION OF DRAWINGS

FIG. 1 is a fragmentary partly diagrammatic elevation illustrative of a preferred embodiment of the invention;

FIG. 1A is a section across a blank cut from an extruded striated soap column;

FIG. 2 is an end view of the grip roller mount;

FIG. 3 is a section substantially on line 3—3 of FIG. 2 showing detail; and

FIG. 4 is a section through a bar of striated soap made according to the invention.

PREFERRED EMBODIMENTS

FIG. 1 illustrates the extrusion end of a conventional type plodder assembly which may for example be that disclosed in Compa et al. U.S. Pat. No. 3,485,905 and wherein as disclosed in said Compa et al. patent the extruded soap is variegated, that is it contains striations or streaks 15' of a color distinct with respect to the base soap color. These striations are usually linear and fairly straight, extending across the extrusion cross section substantially as diagrammatically shown in FIG. 1A. They may not be parallel.

Thus in FIG. 1 the concical end 11 of the plodder assembly is provided with a fixed nozzle plate 12 secured on the plodder end as by a threaded cap 13. The shape of the opening 14 in plate 12 determines the uniform cross sectional shape of the extrusion, and here opening 14 is circular and the extrusion 15 is cylindrical.

In the invention the extrusion while still warm passes through a twist roller assembly 16 wherein it is gripped and continuously subjected to torque about an axis in the direction of extrusion. The twist assembly is mounted a predetermined distance $d$ forwardly of the nozzle, this distance being selected to provide a desired spiral or like pitch of the striations in the final soap bar. The column is subjected to torque throughout the zone $d$.

Referring to FIG. 3 the longitudinally moving extrusion passes through two grip roller passes disposed at right angles to each other and mounted on a continuously rotating support. More specifically a generally vertical disc plate 17 having a central opening 18 large enough to permit free longitudinal passage of the extrusion column 15 has an annular lateral extension 19 formed with an internal continuous groove 21 surrounding a stationary circular track 22. This mounts disc 17 for rotation about the axis of the extrusion column and restrains the disc against axial displacement.

A first pair of cooperating parallel grip rollers 23 and 24 are mounted for free rotation on parallel spindles 25 and 26 respectively extending between fixed bracket pairs 27 and 28 projecting from one side of disc 17. As shown in FIG. 2 the peripheral surfaces 29 and 31 of rollers 23 and 24 are concave with a curvature substantially that of the extrusion passing therebeween.

A second pair of cooperating parallel grip rollers 32 and 33 are mounted for rotation on parallel spindles 34 and 35 respectively extending between fixed bracket pairs 36 and 37 projecting from opposite side of disc 17. These rollers similarly have smooth concave peripheral surfaces 38 and 39 with a curvature substantially that of the extrusion column.

As shown each pair of rollers defines a circular pass that engages the extrusion column around nearly 360° of its periphery. The spacing of spindle 25 with respect to spindle 26 and spindle 34 with respect to spindle 35 is such that the rollers snugly engage the column. If desired the spindles may be mounted on spring biased supports to urge them against the column. Preferably each pair of rollers grips the soft moist column so as to impart a slight radial compression.

As shown in FIGS. 2 and 3 the axes of rotation of rollers 23, 24 extend at right angles to the axes of rotation of rollers 32 and 33, and the rollers are symmetrically arranged about the axis of the soap column. As shown in FIG. 3 the roller pairs engage the soap column in closely successive longitudinal regions.

The outer periphery of disc 17 carries or is formed to provide a toothed ring gear 41. A pinion 42 driven by an electric motor M meshes with gear 41, and when the motor is energized disc 17 rotates at a selected slow constant speed about the axis of the soap column. A gear box may be provided between the motor and pinion 42 to provide any desired speed reduction.

In operation a striated plodded soap column 15 issues from nozzle plate 12 as in said Compa et al patent. In a workable phase the core of the issuing column had a temperature range between 100° and 105° F. and it retained softness and moistness with a hardness (Dietert Hardness Indicator Scale B) in the range of 85 to 89. At plate 12 the column is moving longitudinally with little or no rotation component. The rotation of disc 17 at the twist assembly 16 however imparts rotative movement to the column section passing therethrough and the length of moving column between plate 12 and assembly 16, which is close enough to the plodder to retain its plasticity and ability to twist without deformation, is imparted a twist above the column axis thereby effecting directional changes in the color striations. The striations assume a substantially spiral configuration and the degree of spiral is governed by the distance $d$ and the speeds of disc 17 and column 15. In this preferred phase of the invention the speed of rotation of disc 17 is so correlated to the longitudinal speed of column 15 and the distance $d$ that an effective twist angle of between 40°-65° is imparted to the column 15. The mechanism at the twist assembly freely passes the soap column while twisting it relative to its direction of movement, so that a predetermined length of extruding column is continually twisted without impeding longitudinal movement of the column.

Where the soap column is about 1 11/16 inches in diameter and moving longitudinally at a rate of about 240 inches per minute, a speed of about 20 revolutions per minute for disc 17 has been found quite satisfactory.

Downstream of the twist assembly 16, the column is subdivided at 44 in the usual way into blanks as at 45 and each blank pressed to final bar form in a conventional die as at 46. FIG. 4 shows a cross section of a soap bar 47 which as been made from blank 45 and pressed in a direction longitudinally of the column axis. The blank severing and pressing operations may be carried out in any convention apparatus, as for example that disclosed in the above-identified Matthei patent. The color striations in a section of FIG. 4 exhibit a pleasing spiral effect wherein curved striations extend generally diagonally across the bar cross section.

While the invention is disclosed as incorporated in a plodder wherein the grip rollers embrace a cylindrical column, it is equally applicable to plodders wherein the extruding column is of rectangular or other cross section, and the concave peripheral surfaces of the twist rollers on plate 17 is shaped to conform to the soap column regardless of the column shape in cross section.

The rollers 23, 24 and 32, 33 are disclosed as idly rotatably mounted. The invention comtemplates powered rotation of these rollers for special effects. This could be accomplished by providing motion transmitting connections between the rotating disc 17 and each roller.

While two 90° displaced sets of grip rollers are above described the invention contemplates the use of other sets selectively arranged along the column.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. Apparatus for producing variegated soap bars having desired contoured striations comprising means for continually extruding a relatively warm plastic solid striated soap column for a plodder nozzle, said column comprising a soap of a base color having directional striations of a different color, means for peripherally gripping said moving column at a region located substantially immediately forwardly of said nozzle where the column retains its plasticity and ability to twist without deformation and there applying a predetermined torque for twisting the column about its longitudinal axis through a predetermined angle in a predetermined direction relative to its direction of movement from said nozzle while permitting substantially unimpeded longitudinal movement of said extruding column away from the nozzle, whereby to change the directional characteristics of said striations, and means downstream of said gripping means for subdividing the twisted column into blanks and pressing said blanks into soap bars exhibiting the directionally changed striations.

2. Apparatus as defined in claim 1 wherein said gripping means comprises means for rotating said gripping means relative to said axis at a speed correlated to the longitudinal speed of the column region being twisted.

3. Apparatus as defined in claim 1, wherein said gripping means comprises at least one pair of rollers arranged and peripherally formed to engage said column in substantially full surface contact from opposite sides.

4. Apparatus as defined in claim 3, wherein said rollers are parallel idler rollers carried by a support and means is provided operatively associated with said support for rotating said support about said axis.

5. Apparatus as defined in claim 3, wherein each of said rollers has a smooth concave peripheral surface of substantially the shape of the periphery of said column.

6. Apparatus as defined in claim 3, wherein there is more than one pair of said rollers mounted on a common rotatable support, and said pairs of rollers are relatively angularly displaced about said axis.

7. Apparatus as defined in claim 3, wherein there are two pairs of said rollers mounted on a common rotatable support, and the axes of said pairs of rollers are relatively displaced substantially ninety degrees about said axis.

* * * * *